US009214884B2

(12) United States Patent
Sonoda et al.

(10) Patent No.: US 9,214,884 B2
(45) Date of Patent: Dec. 15, 2015

(54) MOTOR DRIVING DEVICE AND BRUSHLESS MOTOR

(71) Applicant: Panasonic Corporation, Kadoma-shi, Osaka (JP)

(72) Inventors: Daisuke Sonoda, Osaka (JP); Yasushi Kato, Kyoto (JP); Yasuyuki Yokouchi, Osaka (JP); Mitsuhiro Sakamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/242,160

(22) Filed: Apr. 1, 2014

(65) Prior Publication Data

US 2014/0306626 A1 Oct. 16, 2014

(30) Foreign Application Priority Data

Apr. 11, 2013 (JP) ................................. 2013-082733

(51) Int. Cl.
*H02P 21/00* (2006.01)
*H02P 6/00* (2006.01)
(52) U.S. Cl.
CPC ............ *H02P 21/0035* (2013.01); *H02P 6/002* (2013.01)

(58) Field of Classification Search
CPC .............................. H02P 21/0035; H02P 6/002
USPC ...................................................... 318/400.02
See application file for complete search history.

(56) References Cited

U.S. PATENT DOCUMENTS

| 2001/0002784 A1* | 6/2001 | Masaki et al. ................ 318/727 |
| 2006/0235576 A1* | 10/2006 | Matsuda ........................... 701/1 |
| 2009/0234538 A1* | 9/2009 | Ta et al. .......................... 701/41 |

FOREIGN PATENT DOCUMENTS

| JP | 2001-292589 | 10/2001 |
| JP | 2004-040906 | 2/2004 |
| WO | 2007/132889 | 11/2007 |

* cited by examiner

*Primary Examiner* — Erick Glass
(74) *Attorney, Agent, or Firm* — Hamre, Schumann, Mueller & Larson, P.C.

(57) ABSTRACT

A motor driving device of the present invention is a motor driving device that incorporates so-called vector control of controlling a current applied to a motor winding in accordance with the position of a rotor. The motor driving device receives the input of a duty command value from a host controller via a command input port, for example. The motor driving device obtains a current command or a speed command as a command value such that the input duty command value is equal to the duty of a drive pulse output from an inverter. Then, the motor driving device performs vector control based on the obtained command value.

7 Claims, 10 Drawing Sheets

MOTOR DRIVING DEVICE AND BRUSHLESS MOTOR

BACKGROUND OF THE INVENTION

1. Field of the Invention

The present invention relates to a motor driving device for rotationally driving a brushless motor.

2. Description of the Related Art

In brushless motors for household electric appliances such as fan motors for air-conditioners, a motor incorporating a motor driving device inside the motor is recently put into practical use. The motor driving device includes circuit components such as an inverter, a CPU (central processing unit), and a position sensor such as a hall element. In such a configuration, the CPU generates a switching signal to the inverter, and a motor winding is energized with a rectangular wave voltage or a sine wave voltage. Thus, the motor driving device drives the motor.

A host controller for controlling the motor driving device adjusts a duty command input to the motor driving device such that speed, air quantity or the like becomes a desired value, on a basis of a signal indicating the actual number of rotations, which is received from the side of the motor driving device, or the like.

FIG. 9 is a block diagram showing a configuration example of such conventional motor driving device 98. After AC power supply 11 is rectified by rectifier circuit 21 to be smoothed through smoothing capacitor 22, the DC voltage is supplied to three-phase inverter 23 included in motor driving device 98. Inverter 23 converts the DC voltage into an arbitrary AC voltage, and the converted AC voltage is supplied to motor 19. Position sensor 32 detects the position of a rotor of motor 19 to output this position as position detection signal Ps. Position detection signal Ps is supplied to position detector 34, the position of the rotor is computed to be supplied to FG output unit 54 as motor position signal Pd. FG output unit 54 outputs FG pulse signal FG indicating actual motor speed, on the basis of motor position signal Pd.

Additionally, FG pulse signal FG is supplied from FG output unit 54 to host speed controller 51 on the side of host controller 12. Host speed controller 51 adjusts duty command value D* such that speed, air quantity or the like becomes a desired value, based on FG pulse signal FG, to output adjusted duty command value D* to motor driving device 98.

Motor driving device 98 supplies, to voltage controller 57, duty command value D* received from host controller 12. Voltage controller 57 obtains values of three-phase voltage command values $V_u^*$, $V_v^*$ and $V_w^*$, from input duty command value D* and motor position signal Pd, to output the obtained values to PWM controller 59. PWM controller 59 generates a switching signal obtained by arranging pulses with duty according to the values of voltage command value $V_u^*$, $V_v^*$ and $V_w^*$ in time series. Then, inverter 23 applies drive pulses Uo, Vo and Wo with duty according to this switching signal to the motor winding. By such operation, rectangular wave voltages or sine wave voltages are artificially generated from drive pulses Uo, Vo and Wo on the basis of pulse-width modulation (PWM), to be applied to the motor windings, thereby driving motor 19.

As a configuration example of such a motor driving device, for example, Unexamined Japanese Patent Publication No. 2001-292589 discloses a fan motor having a configuration in which an inverter is driven by drive pulses according to a duty command.

As a higher performance control system than rectangular wave drive system in which rectangular wave voltages are applies, or a sine wave drive system in which sine wave voltages are applied, described above, there is widely known a so-called vector control system in which a motor winding current is controlled in accordance with the position of a rotor. In vector control, a current in a magnet torque direction (q-axis current) that is generated by permanent magnets, and a current in a magnetic flux direction (d-axis current) that is generated by permanent magnets can be independently controlled. Therefore, it is possible to implement high efficiency, low noise, and high speed response, compared to the rectangular wave drive system or the sine wave drive system.

As a configuration example of a motor driving device using such a vector control system, for example, Unexamined Japanese Patent Publication No. 2004-40906 discloses a vector control device of a synchronous motor.

FIG. 10 is a block diagram of conventional motor driving device 99 that is configured to control motor speed by such vector control. Conventional motor driving device 99 shown in FIG. 10 also has a configuration in which motor 19 is driven by inverter 23. In FIG. 10, motor position signal Pd is supplied to differentiator 60. Differentiator 60 computes the speed of a rotor by differentiation of this motor position signal Pd. The speed thus computed is supplied to speed controller 56 as motor speed signal Sp indicating the actual speed of the rotor.

Speed controller 56 computes current command value I* from speed command value Sp* and motor speed signal Sp. Current controller 53 obtains three-phase voltage command values $v_u^*$, $v_v^*$ and $v_w^*$ from current command value I*, current detection signal Id indicating the winding current of a motor detected from current detector 31, and motor position signal Pd, to output three-phase voltage command values $v_u^*$, $v_v^*$ and $v_w^*$ to PWM controller 59. Herein, current controller 53 has a configuration based on the vector control system, and in current controller 53, a current is separated into a q-axis current in a torque direction and a d-axis current in a direction orthogonal to the torque direction for processing. Then, current controller 53 receives a current command for setting a current to current command value I*, and computes voltage command values $v_u^*$, $v_v^*$ and $v_w^*$ for supplying power to the motor windings.

Conventional motor driving device 99 shown in FIG. 10 attains high efficiency, low noise, and high speed response, as a configuration in which such a vector control system is used.

However, in a case where it is intended to introduce the vector control as it is, it is necessary to control by use of such a current command as to set the current to current command value I* like conventional motor driving device 99 shown in FIG. 10. Therefore, for example, in a case where the vector control is introduced to the configuration shown in FIG. 9, it is necessary to change a current command from the side of a host unit from a duty command to a current command, thereby causing a problem that not only a motor driving device but also a host controller are required to be changed.

In Unexamined International Patent Publication No. 2007/132889, when the vector control is introduced, an inverter circuit inside a motor is moved onto an external indoor control board, the generation of a switching signal that has performed by a CPU inside the motor is performed by a microcomputer on the indoor control board, which requires significant change.

SUMMARY OF THE INVENTION

A motor driving device of the present invention is a motor driving device that incorporates so-called vector control of controlling a current applied to a motor winding in accordance with the position of a rotor. The motor driving device obtains a current command or a speed command as a command value such that the input duty command value is equal to the duty of drive pulses output from an inverter. Then, the motor driving device performs vector control based on the obtained command value. According to the motor driving device, it is possible to control the output duty of the inverter to duty desired by the host controller during vector control.

Consequently, it is possible to provide a motor driving device for a brushless motor incorporating vector control, only by the change of a motor control circuit unit without the change of the host controller.

DETAILED DESCRIPTION OF THE PREFERRED EMBODIMENTS

Hereinafter, Exemplary Embodiments of the present invention are described with reference to the drawings. The present invention is not limited by these Exemplary Embodiments.

First Exemplary Embodiment

Figure 1:
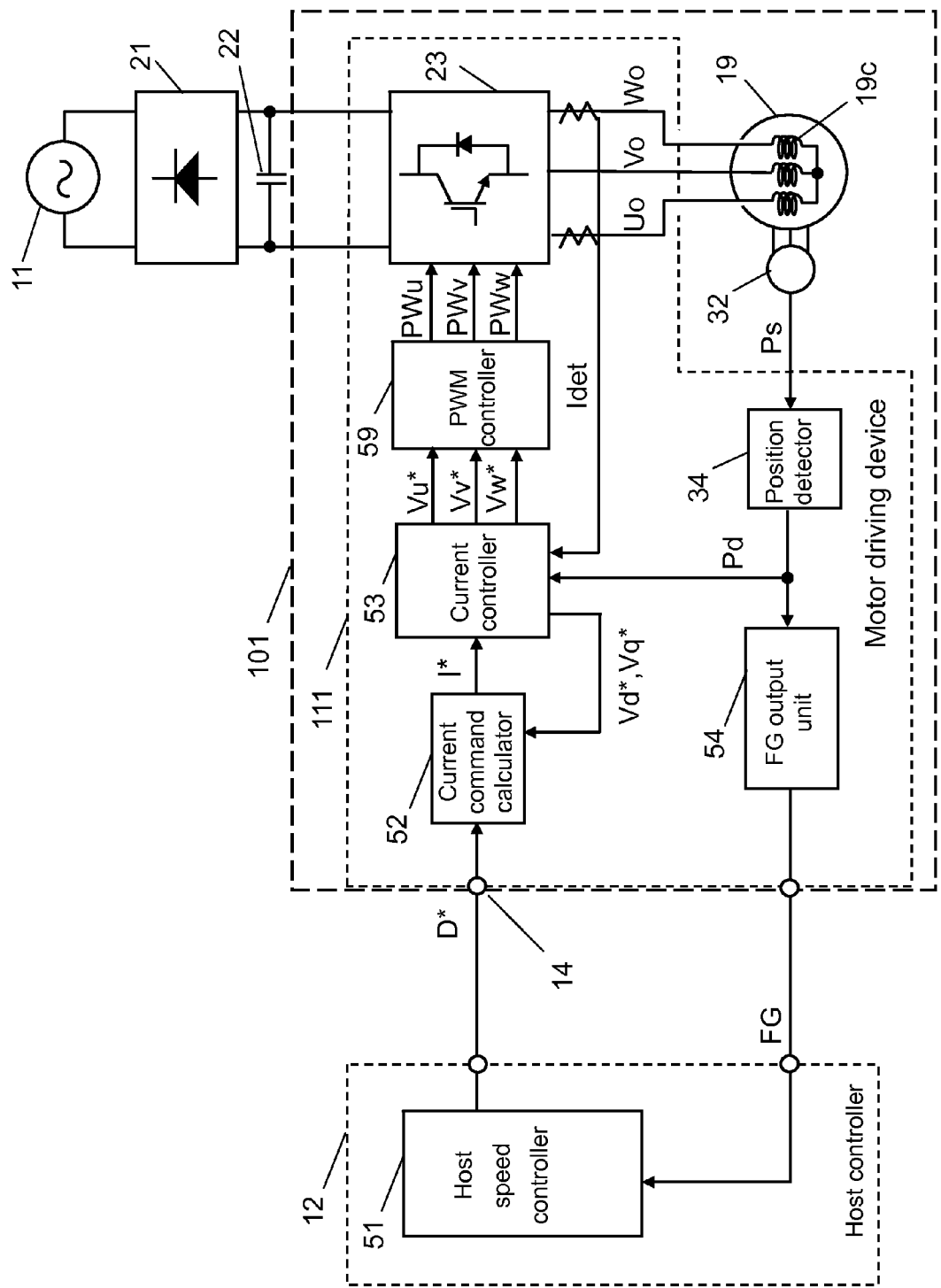
FIG. 1 is a block diagram of a configuration including a motor driving device according to First Exemplary Embodiment of the present invention.

FIG. 1 is a block diagram of a motor driving system including brushless motor 101 provided with motor driving device 111 according to First Exemplary Embodiment of the present invention. Motor driving device 111 is configured to perform vector control by use of a current command obtained from a duty command.

As shown in FIG. 1, a motor driving system in this Exemplary Embodiment includes brushless motor 101, and host controller 12 that controls this brushless motor 101. In this Exemplary Embodiment, brushless motor 101 is mounted with circuit components that function as motor driving device 111. That is, as shown in FIG. 1, in brushless motor 101, motor driving device 111 rotationally drives motor 19.

In FIG. 1, after AC power supply 11 is rectified by rectifier circuit 21 to be smoothed through smoothing capacitor 22, the DC voltage is supplied to three-phase inverter 23 included in motor driving device 111. Three-phase inverter converts the DC voltage into an arbitrary AC voltage, and the converted AC voltage is supplied to motor 19. In this Exemplary Embodiment, motor 19 is thus driven in three phases, namely, a U phase, a V phase, and a W phase that are different from each other by 120 degrees.

Figure 2:
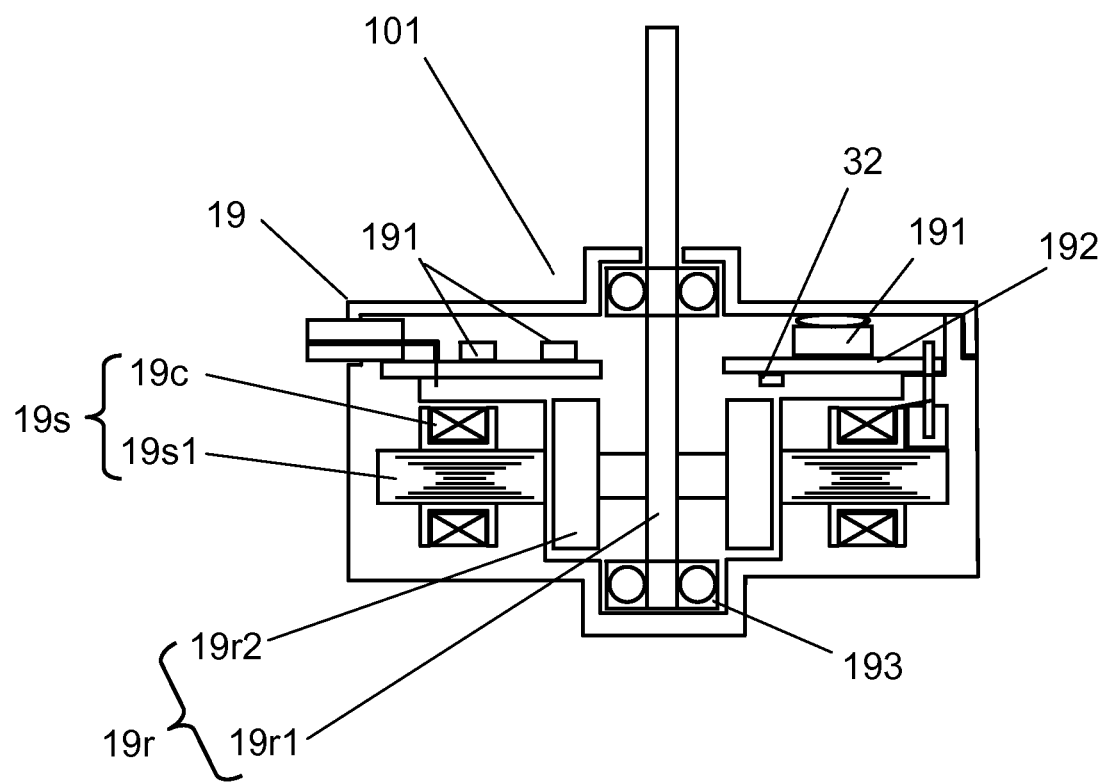
FIG. 2 is a sectional view of a brushless motor incorporating the motor driving device according to the present invention.

FIG. 2 is a sectional view showing a configuration example of motor 19 in this Exemplary Embodiment. As shown in FIG. 2, motor 19 includes rotor $19r$ and stator $19s$. Rotor $19r$ has permanent magnets $19r2$ about shaft $19r1$. Stator $19s$ is configured such that motor windings $19c$ are wound around stator cores $19s1$.

Furthermore, in this Exemplary Embodiment, as described above, brushless motor 101 is configured such that circuit components 191 that function as motor driving device 111 are incorporated in motor 19. These circuit components 191 are mounted on circuit board 192, and position sensor 32 is also mounted on circuit board 192 in order to detect the rotational position of rotor $19r$, for example. In such a structure, motor windings $19c$ are energized and driven by AC power, so that rotor $19r$ is rotatably supported by bearing 193 to rotate. Furthermore, position sensor 32 detects the position of rotor $19r$ to output, to motor driving device 111, position detection signal Ps indicating the detected position.

Host controller 12 is included in, for example, an apparatus mounted with brushless motor 101, or the like, and controls the operation of brushless motor 101, or the like. In order to perform such control, host controller 12 includes host speed controller 51 that is configured by a CPU (Central Processing Unit), a DSP (Digital Signal Processor), or the like. Motor driving device 111 is notified of a command for rotationally controlling motor 19, from such host speed controller 51 via a signal transmission line. FG pulse signal FG indicating the actual number of rotations is supplied to host speed controller 51 from motor driving device 111.

In this Exemplary Embodiment, as a command from host controller 12, duty command value D* for commanding the duty of drive pulses applied to motor windings $19c$ on the basis of PWM modulation of the inverter is notified to command input port 14 of motor driving device 111. That is, host speed controller 51 adjusts duty command value D* such that speed, air quantity or the like is a desired value based on FG pulse signal FG, to control the rotation in motor 19. Herein, the duty means the ratio of a pulse width to a pulse periodic width in a pulse signal such as a drive pulse. For example, when duty command value D* indicates 90%, a drive pulse whose pulse width is 90% in one period is output.

A configuration of motor driving device 111 is now described. Motor control device 111 includes current command calculator 52, current controller 53, PWM controller 59, inverter 23, position detector 34, and FG output unit 54. As described above, sensor signal Ps is supplied to motor driving device 111 from position sensor 32 arranged on motor 19.

In motor driving device 111, sensor signal Ps is supplied to position detector 34. Position detector 34 computes the position of rotor $19r$ by use of this sensor signal Ps, to output the computed position as motor position signal Pd. Motor position signal Pd is supplied to FG output unit 54 and current controller 53. FG output unit 54 generates FG pulse signal FG that is a signal indicating the actual number of rotations of motor 19, on the basis of this motor position signal Pd. Herein, FG pulse signal FG is a pulse signal of a frequency proportional to the number of rotations of a motor, which is called an FG signal. This FG pulse signal FG is transmitted to host controller 12.

The duty command value D* notified from host controller 12 is supplied to current command calculator 52 via command input port 14. Current command calculator 52 computes current command value I* such that the duty of drive pulses Uo, Vo and Wo output from inverter 23 becomes duty indicated by duty command value D* input from the side of host controller 12. That is, current command calculator 52 functions as a command generator that generates a command value such that duty command value D* and the duty of drive pulses Uo, Vo and Wo are equal, and generates current command value I* that is a current command as a command value.

Current controller 53 obtains voltage command values Vu*, Vv* and Vw* from current command value I*, motor winding current value Idet detected from current detector 31, and motor position signal Pd computed from position detector 34, to output the obtained voltage command values to PWM controller 59.

PWM controller 59 generates respective voltage command signals corresponding to voltage command values Vu*, Vv* and Vw* supplied from current controller 53 in respective phases. Then, PWM controller 59 applies pulse-width modulation to the generated voltage command signals as respective modulation signals, to output the modulated signals as drive pulse signals PWu, PWv and PWw configured in a pulse train to which pulse-width modulation is applied.

Inverter 23 energizes motor windings 19c for respective phases on the basis of drive pulse signals PWu, PWv and PWw, to drive motor windings 19c. Inverter 23 includes switching elements on the sides of a positive electrode and a negative electrode of a power supply, for each phase. When the switching elements are turned on/off by the pulse timing of drive pulse signals PWu, PWv and PWw, drive pulses Uo, Vo and Wo are supplied from respective drive outputs to motor windings 19c via the switching elements of ON from the power supply. Herein, in this Exemplary Embodiment, assuming that the duty of drive pulses Uo, Vo and Wo is duty D, feedback control is performed such that duty D becomes duty command value D*. Therefore, inverter 23 in this Exemplary Embodiment energizes and drives motor windings 19c with drive pulses Uo, Vo and Wo with the duty of duty command value D*. Considered from a different angle, drive pulses Uo, Vo and Wo are signals to which pulse-width modulation is applied by voltage command signals, and therefore inverter 23 in this Exemplary Embodiment equivalently supplies respective drive voltages corresponding to voltage command values Vu*, Vv* and Vw* to motor windings 19c, to energize and drive motor windings 19c.

Figure 3:
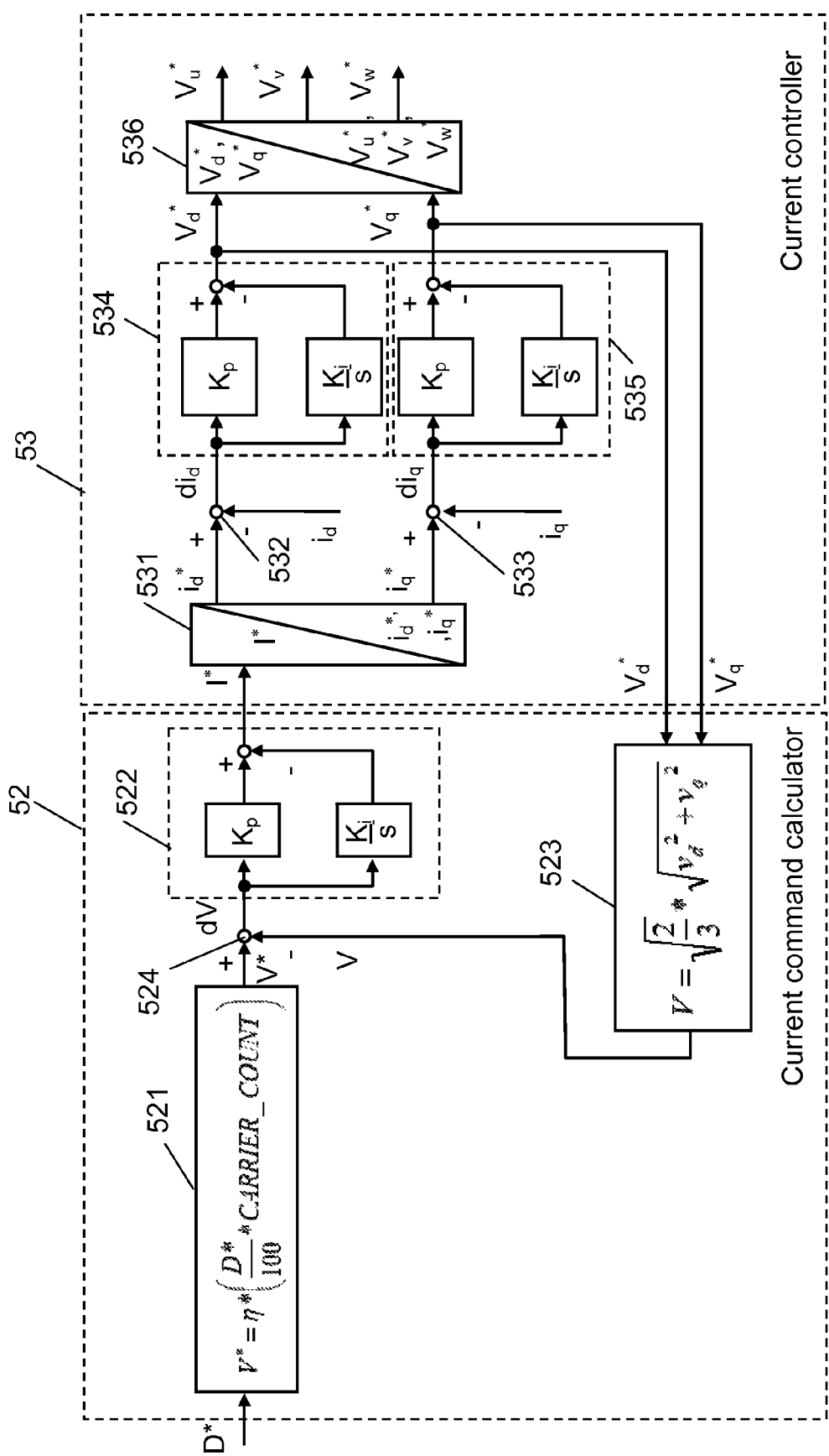
FIG. 3 is a block diagram showing detailed configurations of a current command calculator and a current controller according to First Exemplary Embodiment of the present invention.

Current command calculator 52 and current controller 53 are now described in more detailed. FIG. 3 is a block diagram showing detailed configurations of current command calculator 52 and current controller 53 according to this Exemplary Embodiment. In this Exemplary Embodiment, current command calculator 52 is configured as shown in FIG. 3, so that current command value I* supplied to current controller 53 is computed such that a difference between duty command value D* and the duty of drive pulses Uo, Vo and Wo that is the actual output of inverter 23 becomes zero.

The relation between amplitude $V_{ph\_amp}$ of a phase voltage, and d-axis voltage $v_d$ and q-axis voltage $v_q$ is expressed by the following (Expression 1).

$$V_{ph\_amp} = \sqrt{\frac{2}{3}} \times \sqrt{v_d^2 + v_q^2} \quad \text{(Expression 1)}$$

Assuming that a voltage utilization factor is denoted by $\eta$, and the carrier wave amplitude of inverter 23 is denoted by CARRIER_COUNT, the relation between amplitude $V_{ph\_amp}$ of the phase voltage and duty D by the switching of inverter 23 is expressed by the following (Expression 2).

$$V_{ph\_amp} = \eta \times \left(\frac{D}{100} \times \text{CARRIER\_COUNT}\right) \quad \text{(Expression 2)}$$

Voltage utilization factor $\eta$ is determined by the modulation system of inverter 23. In a case of a three-phase modulation system, voltage utilization factor $\eta$ is about 0.87. In a case of a two-phase modulation system or a triple harmonics injection system of superimposing harmonics according to the variation of the center value between upper and lower envelopes of carrier waves in three-phase modulation, voltage utilization factor $\eta$ is 1.

Herein, d-axis voltage command $v_d^*$ and q-axis voltage command $v_q^*$ that are the operation amount of current controller 53 are substituted for (Expression 1), so that output voltage V corresponding to an actual voltage during operation at the present time can be obtained. In FIG. 3, such output voltage V is obtained by output voltage calculator 523.

Duty command value D* is substituted for (Expression 2), so that voltage command V* corresponding to duty command value D* can be obtained. In FIG. 3, such voltage command V* is obtained by voltage command calculator 521.

In this Exemplary Embodiment, feedback control is performed such that a deviation between voltage command V* and output voltage V thus obtained becomes zero, thereby computing current command value I* for performing vector control. That is, current command calculator 52 is thus configured, so that current command value I* for performing the vector control is obtained from duty command value D*. As shown in FIG. 3, current command calculator 52 causes subtracter 524 to operate the difference between voltage command V* and output voltage V, to obtain deviation dV. Then, current command calculator 52 outputs a value obtained by performing a PI (Proportional, Integral) process to deviation dV with PI operation unit 522, as current command value I*.

Current controller 53 has a configuration based on the vector control system, in current controller 53, a current is separated into a q-axis current in a torque direction and a d-axis current in a direction orthogonal to the torque direction for processing. In order to perform such vector control, in current controller 53, current coordinate converter 531 computes d-axis current command value $i_d^*$ and q-axis current command value $i_q^*$ of two phases, from current command value I* supplied from current command calculator 52. Additionally, current controller 53 computes d-axis motor winding current value $i_d$ and q-axis motor winding current value $i_q$ of two phases, from current Idet detected from current detector 31. Then, subtracter 532 obtains deviation $di_d$ between d-axis current command value $i_d^*$ and d-axis motor winding current value $i_d$, and PI operation unit 534 performs a PI process to deviation $di_d$, to output deviation $di_d$ as d-axis voltage command $v_d^*$. Additionally, subtracter 533 obtains deviation $di_q$ between q-axis current command value $i_q^*$ and q-axis motor winding current value $i_q$, and PI operation unit 535 further performs a PI process to deviation $di_q$, to output deviation $di_q$ as q-axis voltage command $v_q^*$. Thus, current controller 53 performs feedback control such that a deviation between d-axis current command value $i_d^*$ and d-axis motor winding current value $i_d$, and a deviation between q-axis current command value $i_q^*$ and q-axis motor winding current value $i_q$ each become zero, on the basis of the vector control, to compute d-axis voltage command value $v_d^*$ and q-axis voltage command value $v_q^*$. Current controller 53 causes voltage coordinate converter 536 to perform rotational coordinate transformation and two-phase-three-phase conversion to d-axis voltage command value $v_d^*$ and q-axis voltage command value $v_q^*$. Thus, voltage command values $V_u^*$, $V_v^*$ and $V_w^*$ of three phases are computed. As described above, inverter 23 applies drive pulses Uo, Vo and Wo with duty corresponding to such voltage command values Vu*, Vv* and Vw*, to respective motor windings 19c, thereby energizing and driving motor windings 19c.

As described above, in this Exemplary Embodiment, the feedback control of current command value I* is performed such that a difference between duty command value D* and the duty of drive pulses that is the actual output of the inverter becomes zero, thereby computing current command value I* from duty command value D*. Consequently, according to this Exemplary Embodiment, it is possible to perform the rotation control of a motor on the basis of duty control using duty command value D* with high efficiency, low noise, and high speed response as a configuration in which a vector control system is used. Therefore, it is possible to provide a motor driving device for a brushless motor incorporating vector control, only by the change of a motor control circuit unit.

Second Exemplary Embodiment

Figure 4:
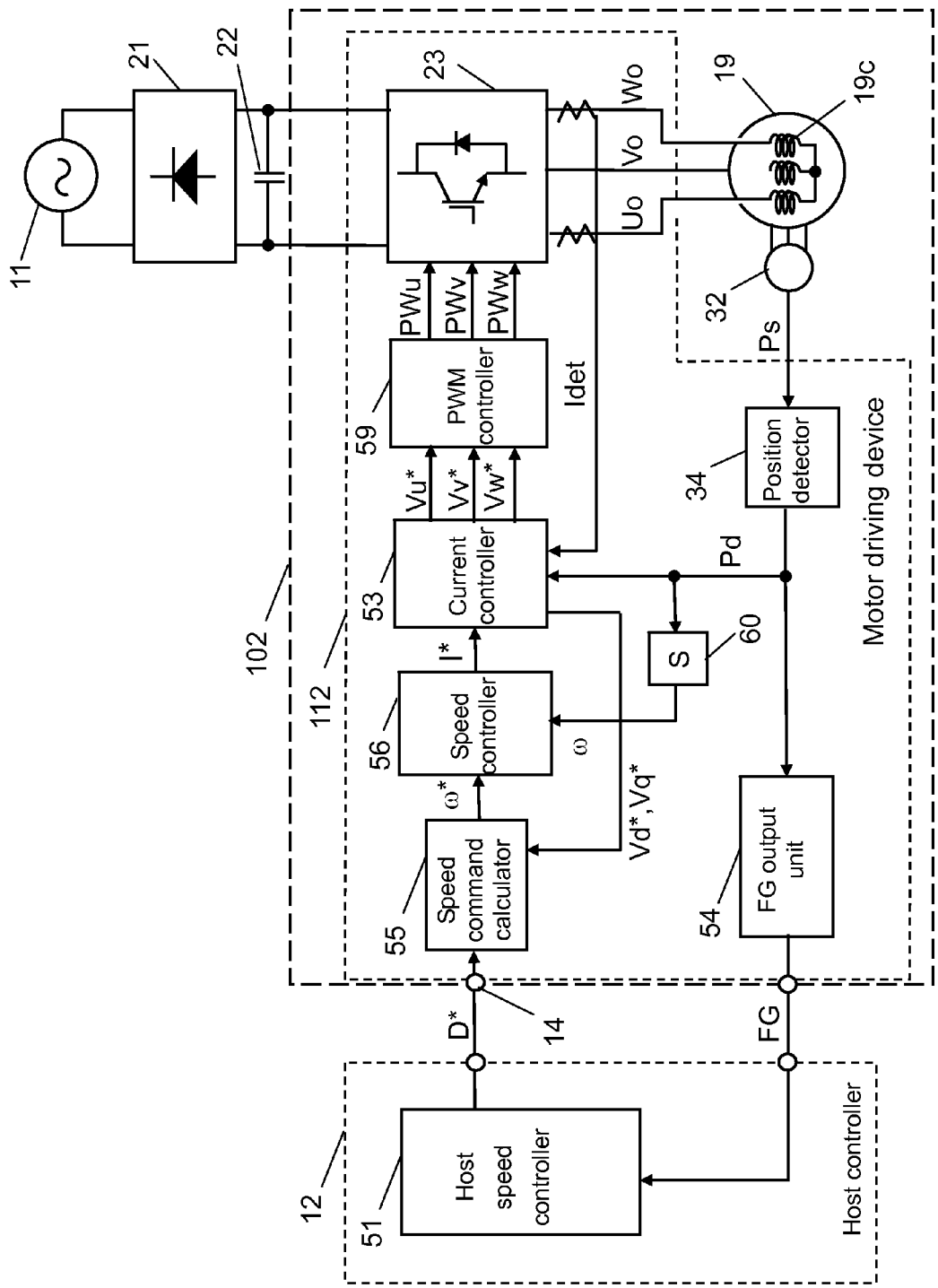
FIG. 4 is a block diagram of a configuration including a motor driving device according to Second Exemplary Embodiment of the present invention.
Figure 5:
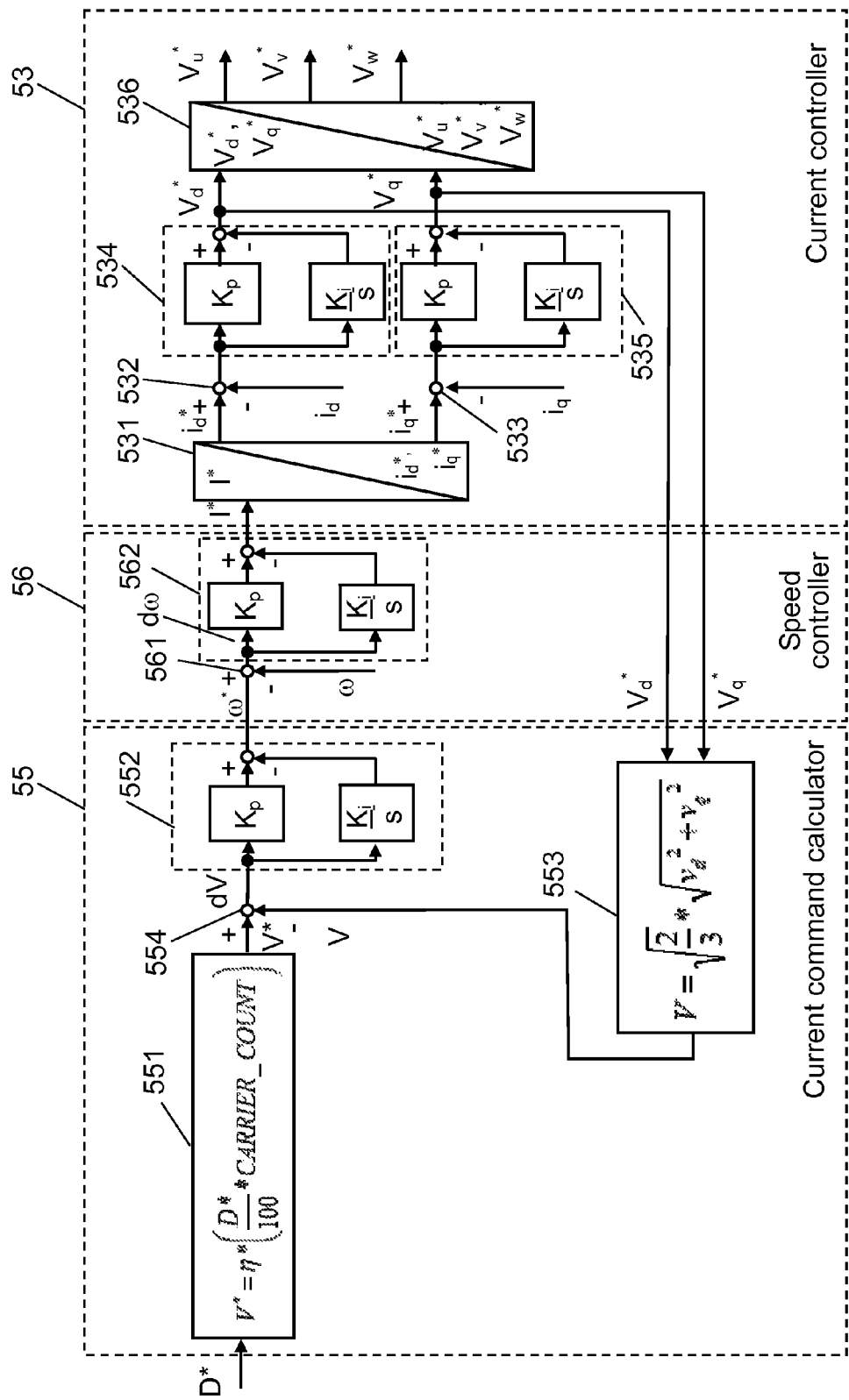
FIG. 5 is a block diagram showing detailed configurations of a speed command calculator, a speed controller, and a current controller according to Second Exemplary Embodiment of the present invention.

FIG. 4 is a block diagram of a motor driving system including brushless motor 102 provided with motor driving device 112 according to Second Exemplary Embodiment of the present invention. Herein, motor driving device 112 is configured to perform vector control by use of a speed command obtained from duty command value D*. Second Exemplary Embodiment is different from First Exemplary Embodiment in that current command calculator 52 is changed to speed command calculator 55 and speed controller 56. In FIG. 4, the same components as those in FIG. 1 are denoted by the same reference numerals, and detailed description of these components are omitted. FIG. 5 is a block diagram showing detailed configurations of speed command calculator 55 and speed controller 56 according to this Exemplary Embodiment.

In FIG. 4, speed command calculator 55 computes speed command value ω* such that the duty of drive pulses Uo, Vo and Wo output from inverter 23 becomes duty command value D* input from the side of host controller 12. Speed command value ω* by speed command calculator 55 is computed by the same configuration as that of current command calculator 52 described in First Exemplary Embodiment. That is, speed command calculator 55 computes speed command value ω* by feedback control such that deviation dV between output voltage V computed from (Expression 1) and voltage command V* computed from (Expression 2) becomes zero, as shown in FIG. 5. In this Exemplary Embodiment, this speed command calculator 55 functions as a command generator that generates a command value such that duty command value D* and the duty of drive pulses Uo, Vo and Wo are equal, and generates speed command value ω* that is a speed command as a command value.

As the configuration of speed command calculator 55, as shown in FIG. 5, speed command calculator 55 causes subtracter 554 to operate a difference between output voltage V obtained by output voltage calculator 553 and voltage command V* obtained by voltage command calculator 551, to obtain deviation dV. Then, speed command calculator 55 outputs a value obtained by performing a PI process to deviation dV with PI operation unit 552, as speed command value ω*.

Speed controller 56 computes current command value I*, from input speed command value ω*, and motor speed ω corresponding to the actual speed of the motor, which is obtained by differential of motor position signal Pd of position detector 34 by differentiator 60. That is, speed controller 56 performs feedback control such that deviation dω between input speed command value ω* and motor speed ω becomes zero, and outputs the operation amount of speed control as current command value I* to current controller 53. As the configuration of speed controller 56, as shown in FIG. 5, speed controller 56 causes subtracter 561 to operate a difference between speed command value ω* and motor speed ω, to obtain deviation dω. Then, a value obtained by performing a PI process to deviation dω with PI operation unit 562 is output as current command value I*.

Current command value I* thus obtained is supplied to current controller 53 that has a configuration based on a vector control system. Similarly to First Exemplary Embodiment, inverter 23 applies drive pulses Uo, Vo and Wo with duty corresponding to voltage command values Vu*, Vv* and Vw* calculated by current controller 53, to respective motor windings 19c, thereby energizing and driving motor windings 19c.

For example, in a case where the upper limit of the speed is desired to be set not only on the host controller side but also on the control circuit side of the motor, as a protection function of the motor, it is difficult to implement the setting of the upper limit of the speed also on the control circuit side in First Exemplary Embodiment in which the speed controller is not included. On the contrary, the motor driving device is configured to have such a configuration as the configuration of this Exemplary Embodiment, so that the setting of the upper limit of the speed on the control circuit side can be easily implemented by the restriction of generated speed command value ω*.

Third Exemplary Embodiment

Figure 6:
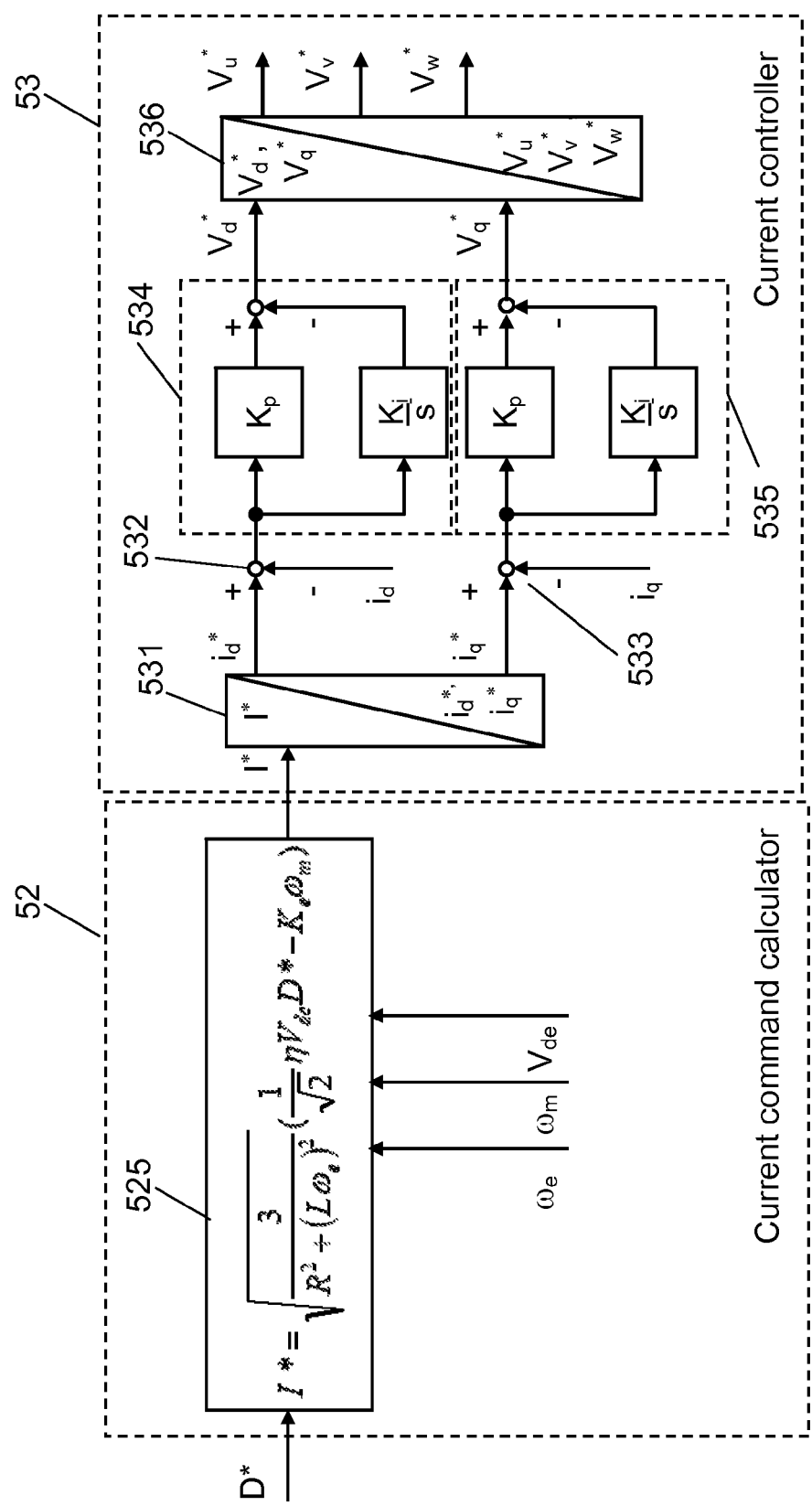
FIG. 6 is a block diagram showing detailed configurations of a current command calculator and a current controller according to Third Exemplary Embodiment of the present invention.

FIG. 6 is a block diagram showing a configuration of current command calculator 52 of a motor driving device according to Third Exemplary Embodiment of the present invention. Third Exemplary Embodiment is different from First Exemplary Embodiment in a configuration in which current command value I* is computed in current command calculator 52. In this Exemplary Embodiment, unlike First Exemplary Embodiment, current command value I* is not obtained by feedback control, but computed by calculation from a reverse model of motor 19.

Figure 7:
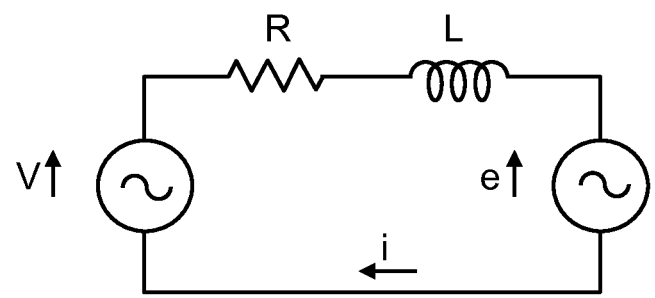
FIG. 7 is an equivalency circuit diagram of a brushless motor.

FIG. 7 is an equivalency circuit diagram of motor 19. Herein, v denotes a voltage applied to motor windings 19c, i denotes a current that flows through motor windings 19c, L denotes the inductance of motor windings 19c, R denotes the resistance of motor windings 19c, and e denotes an induced voltage by permanent magnets of motor 19. From FIG. 7, the voltage equation of motor 19 can be expressed by the following (Expression 3).

$$v = L\frac{di}{dt} + Ri + e \quad \text{(Expression 3)}$$

In a case where (Expression 3) is considered with an effective value, (Expression 3) can be expressed by the following (Expression 4).

$$V_{rms} = \sqrt{R^2 + (L\omega_e)^2} \times I_{rms} + K_e\omega_m \quad \text{(Expression 4)}$$

Herein, Vrms denotes the effective value of the voltage applied to motor windings 19c, $I_{rms}$ denotes the effective value of the current that flows through motor windings 19c, ω, denotes an electrical angle frequency, $\omega_m$ denotes a mechanical angular frequency, and $K_e$ denotes an induced voltage constant.

The relation between a winding voltage and a power supply voltage can be expressed by the following (Expression 5).

$$\sqrt{2} \times V_{rms} = \eta \times V_{dc} \times D \quad \text{(Expression 5)}$$

Herein, $V_{dc}$ denotes a power supply voltage input to inverter 23, and is equal to the amplitude of an AC voltage applied by AC power supply 11. The following (Expression 6) is obtained by (Expression 4) and (Expression 5).

$$I_{rms} = \frac{1}{\sqrt{R^2 + (L\omega_e)^2}} \left( \frac{1}{\sqrt{2}} \times \eta \times V_{dc} \times D - K_e\omega_m \right) \quad \text{(Expression 6)}$$

The relation between d-axis motor winding current value $i_d$ and q-axis motor winding current value $i_q$ can be expressed by the following (Expression 7).

$$I_{rms} = \frac{1}{\sqrt{3}} \times \sqrt{i_d^2 \times i_q^2} \quad \text{(Expression 7)}$$

Duty command value D* input from the host controller is substituted for (Expression 6) and (Expression 7), so that current command value I* can be computed from duty command value D*. That is, in this Exemplary Embodiment, as shown in FIG. 6, current command value I* is computed on the basis of the following (Expression 8).

$$I^* = \sqrt{\frac{3}{R^2 + (L\omega_e)^2}} \left( \frac{1}{\sqrt{2}} \eta V_{dc} D^* - K_e\omega_m \right) \quad \text{(Expression 8)}$$

Compared to First Exemplary Embodiment in which current command value I* is computed by feedback control, in this Exemplary Embodiment, current command value I* is obtained by calculation as described above. Therefore, high responsiveness is obtained, but the obtained value is influenced by an error of a resistance value or the like which is used in calculation.

Fourth Exemplary Embodiment

Figure 8:
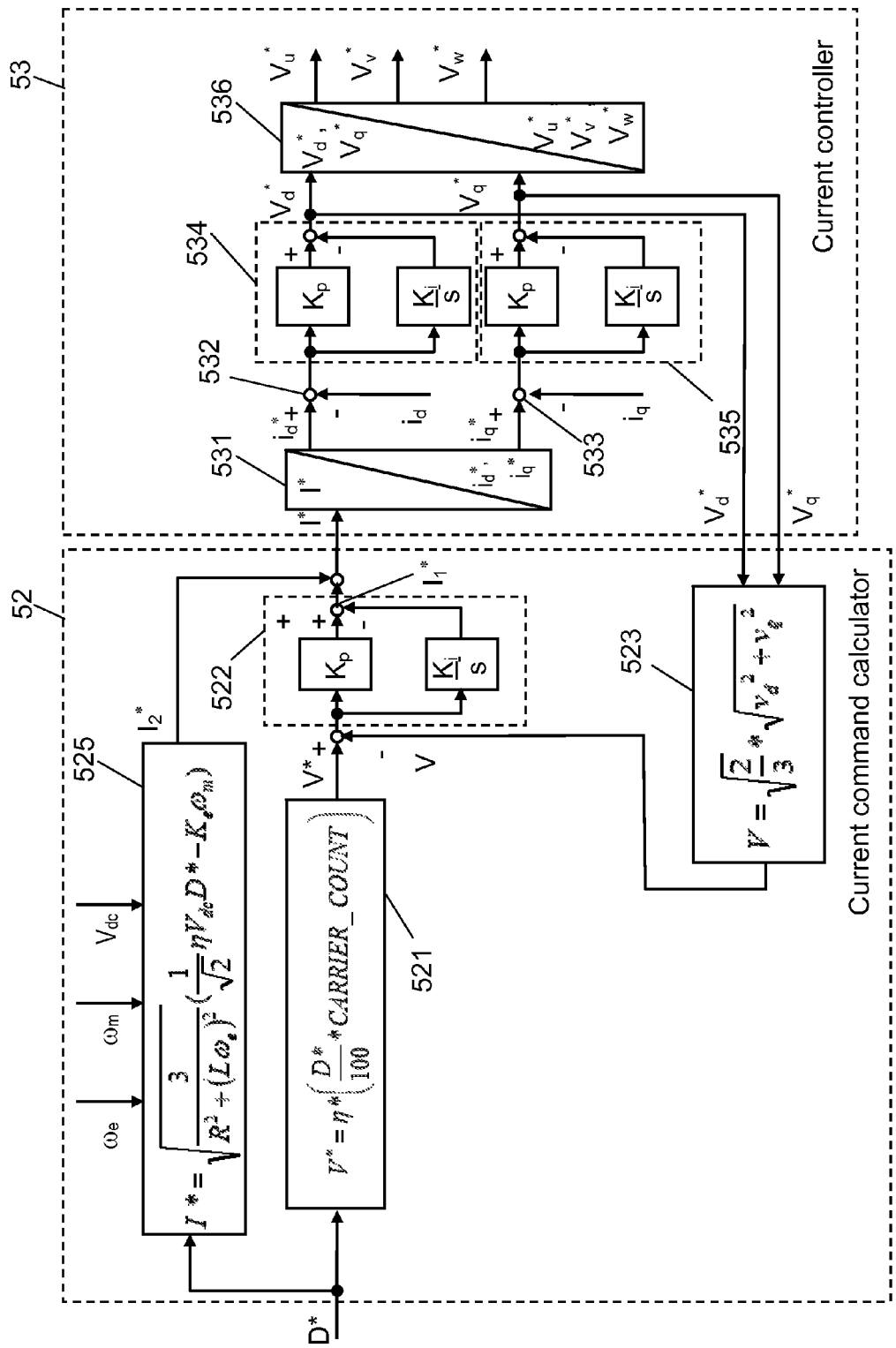
FIG. 8 is a block diagram showing detailed configurations of a current command calculator and a current controller according to Fourth Exemplary Embodiment of the present invention.
Figure 9:
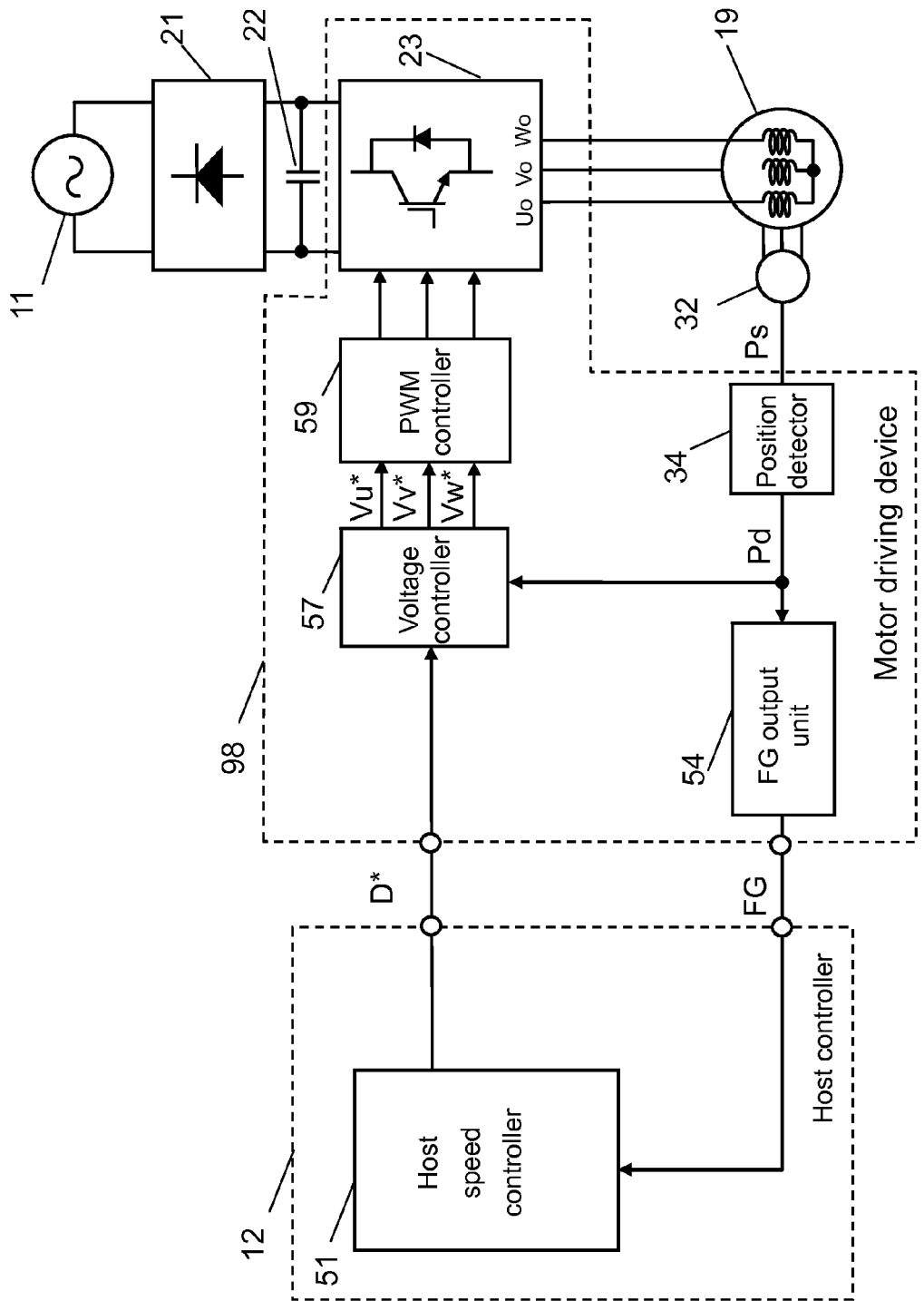
FIG. 9 is a block diagram of a configuration including a conventional motor driving device.
Figure 10:
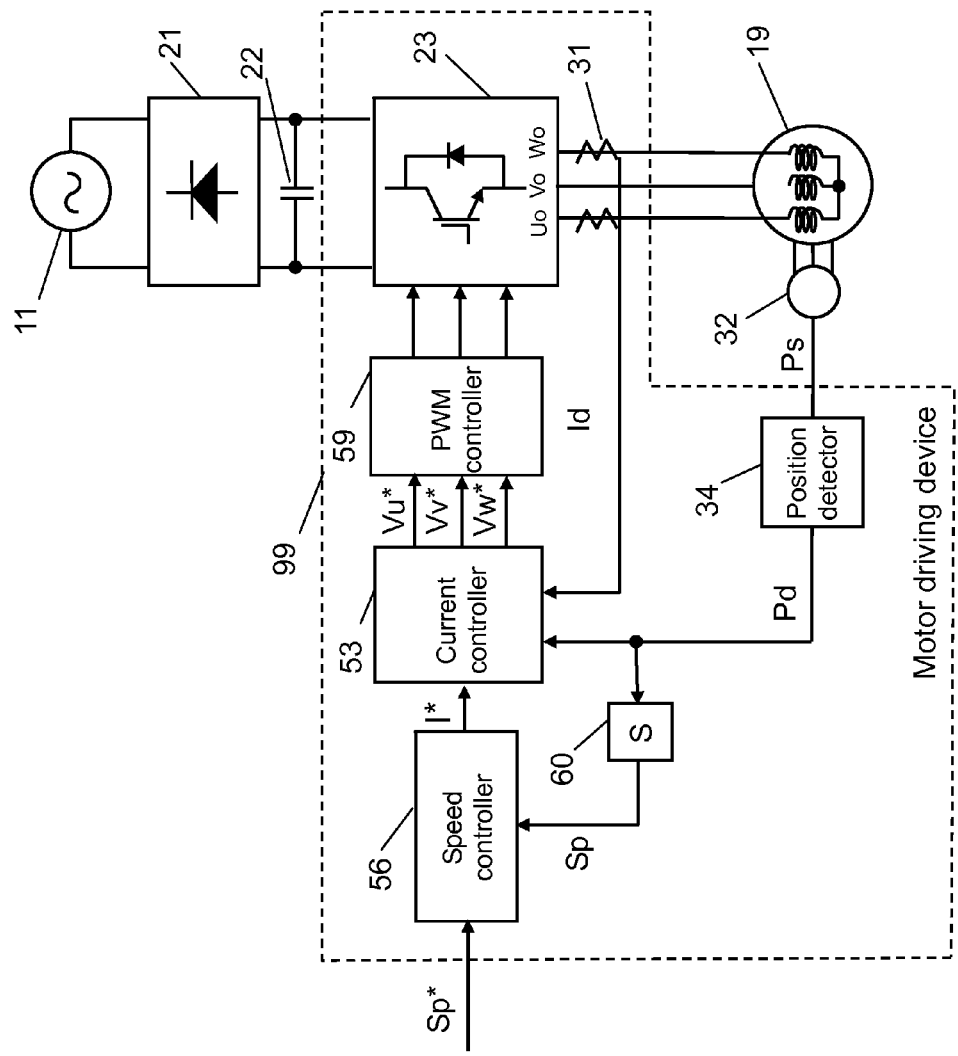
FIG. 10 is a block diagram of a conventional motor driving device in a case where motor speed is controlled by vector control.

FIG. 8 is a block diagram showing a configuration of current command calculator 52 of a motor driving device according to Fourth Exemplary Embodiment of the present invention. Fourth Exemplary Embodiment is different from First Exemplary Embodiment in that a configuration, in which current command value I* is obtained from duty command value D* by the feedback control of the present invention, and a configuration, in which current command value I* is obtained by calculation from a reverse model of a motor, are combined. In this Exemplary Embodiment, a value obtained by adding current command value $I_1$* obtained by feedback control such that a difference between duty command value D* described in First Exemplary Embodiment and actual output duty D of an inverter becomes zero, to current command value $I_2$* obtained from the reverse model of the motor described in Third Exemplary Embodiment is defined as current command value I*, and vector control is performed. This system is so-called two-degree-of-freedom control, and enables both of high responsiveness by the use of a reverse model, and the compensation of the influence of a modeling error by feedback control.

As described above, according to the present invention, in a motor driving device for a brushless motor that performs rectangular wave drive or sine wave drive, vector control that is a control system with higher performance can be introduced only by the change of a motor control circuit unit without the change of the design of a host controller, and the present invention can be utilized generally for motor driving devices for a brushless.

What is claimed is:

1. A motor driving device which receives a duty command value for commanding a duty of a drive pulse for driving a motor winding and generates the drive pulse having the duty pulse according to the duty command value that is input, the motor driving device comprising:
    a command input port configured to be input the duty command value;
    a command generator configured to generate a current command value which corresponds to current amount for energizing the motor winding by using the duty command value that is input to the command input port;
    a current controller configured to generate a voltage command value for applying to the motor winding on the basis of current vector control system that separates a current of the motor winding into a d-axis current and a q-axis current which are orthogonal to each other in accordance with the current command value; and
    an inverter configured to apply the drive pulse, the drive pulse being PWM modulated at the duty according to the voltage command value, to the motor winding.

2. The motor driving device according to claim 1, wherein the command generator generates the current command value based on a voltage deviation between an output voltage and a voltage command, the output voltage obtained based on the voltage command value and the voltage command obtained based on the duty command value.

3. The motor driving device according to claim 2, wherein the command generator obtains a speed command value based on the voltage deviation, obtains a speed deviation between a detected motor speed and the speed command value, and generates the current command value based on the speed deviation.

4. The motor driving device according to claim 2, wherein the command generator generates the current command value by addition of a value based on the voltage deviation, to a current value calculated from a model of a motor equivalent circuit.

5. The motor driving device according to claim 1, wherein the drive pulse having the duty according to the duty command value is generated by feedback control such that a deviation between the input duty command value and the duty of the drive pulse becomes zero.

6. The motor driving device according to claim 1, wherein the command generator generates the current command value by calculation from a model of a motor equivalent circuit.

7. A brushless motor comprising the motor driving device according to claim 1.

\* \* \* \* \*